Figure 1:
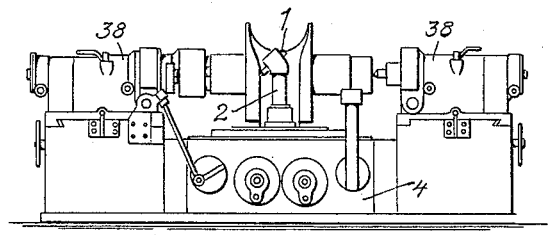

May 23, 1933.　　　　　H. SCHIMMEL　　　　　1,910,308
APPARATUS FOR MACHINING ROLLS FOR ROLLING MILLS AND THE LIKE

Filed Feb. 9, 1931　　　3 Sheets-Sheet 1

INVENTOR
HANS SCHIMMEL
BY Howson and Howson
ATTORNEYS

May 23, 1933.  H. SCHIMMEL  1,910,308
APPARATUS FOR MACHINING ROLLS FOR ROLLING MILLS AND THE LIKE

Filed Feb. 9, 1931   3 Sheets-Sheet 2

INVENTOR
HANS SCHIMMEL
BY
Howson and Howson
ATTORNEYS

May 23, 1933.  H. SCHIMMEL  1,910,308
APPARATUS FOR MACHINING ROLLS FOR ROLLING MILLS AND THE LIKE
Filed Feb. 9, 1931   3 Sheets-Sheet 3

INVENTOR
HANS SCHIMMEL
BY Howson and Howson
ATTORNEYS

Patented May 23, 1933

1,910,308

UNITED STATES PATENT OFFICE

HANS SCHIMMEL, OF KOMOTAU, CZECHOSLOVAKIA

APPARATUS FOR MACHINING ROLLS FOR ROLLING MILLS AND THE LIKE

Application filed February 9, 1931, Serial No. 514,620, and in Germany February 15, 1930.

This invention relates to a method and apparatus for machining rolls for rolling mills and the like, and more particularly to pass rolls for Pilger step rolling mills.

Hitherto, pass rolls for Pilger step rolling mills have been machined on lathes, milling and grinding machines. This method of working is, however, tedious and relatively costly. With the work on the lathe, the cutting operations are effected by rotating the rolls in the direction of the rotary movement thereof when in use. To produce the profile of the circumferential groove in a roll, various movements are imparted to the tool-carrier of the lathe by means which comprise grooved discs and a worm drive.

In another method the machining is effected by arranging a cutting tool so as to be adjustable radially of the roll under the control of a template. In this method, however, the groove cannot be entirely machined, the outwardly inclined, straight side portions of the groove having to be produced by other means.

This invention has for its object the production of the complete profile of the groove in a roll of the kind specified with one apparatus.

This invention comprises a method of machining the circumferential portions of rolls, for example, rolls for Pilger rolling mills, which consists in subjecting a roll to cut axially thereof from an edge cutting tool as the tool rotates and moves in conformity with the contour of the desired cross-section of the roll, in a plane substantially parallel to or coincident with a plane extending through the axis of rotation of the roll, and feeding the roll to the tool between cutting operations thereof by rotating the roll.

Further, this invention comprises a method as set forth in the preceding paragraph which consists in arranging two rolls in side by side relationship with one another and with their axes parallel, and machining the said rolls together with a tool which is arranged to rotate and move between them in a plane substantially parallel to or coincident with the plane extending through the axes of the rolls.

The travel of the tool during the machining of a roll is effected by controlling means which are arranged to effect both the continuous rotation and the periodical travel thereof and the controlling means may consist either of templates or apparatus of known construction.

Apparatus, such as gears arranged to be coupled together and uncoupled may be provided and arranged so that, during a cutting rotational movement of a tool, the effective radius of the tool and the amount of the radial travel thereof, may be varied independently or in dependence of each other. The tool (similar to a lathe turning tool) is preferably arranged to rotate about a vertical axis and is normally disposed in a horizontal plane which coincides with or is located parallel to the horizontal plane which extends through the longitudinal axes of a pair of rolls arranged to be machined together in side by side relationship with one another with their axes located in a horizontal plane.

In order that the invention may be fully understood, reference is directed to the accompanying drawings, in which:—

Figure 2:
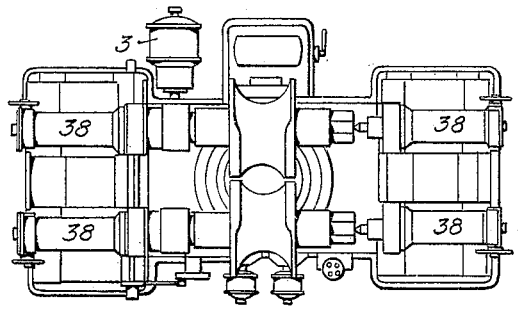
Figure 3:
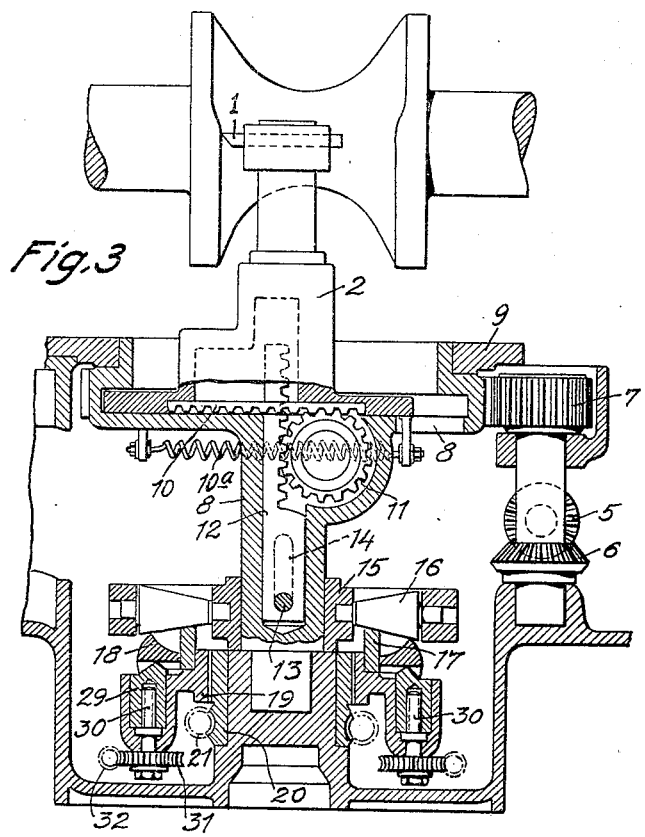
Figure 4:
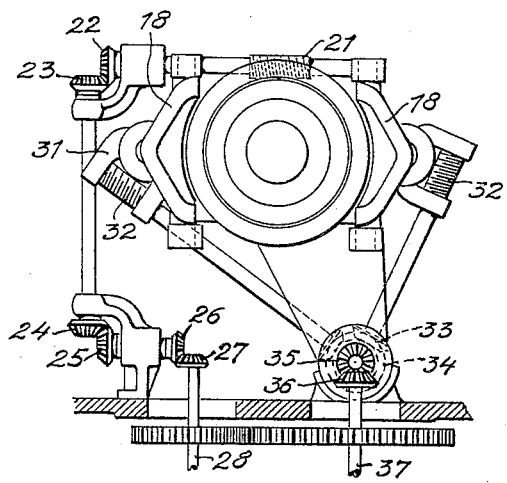

Figures 1 and 2 illustrate, respectively, in front elevation and plan, an apparatus for carrying the process in accordance with this invention into effect, Figure 3 is a vertical longitudinal section through the control mechanism of the tool holder employed in the apparatus illustrated in Figures 1 and 2, Figure 4 is a plan of the control mechanism illustrated in Figure 3 with those parts thereof which rotate with the tool removed.

Figure 7:
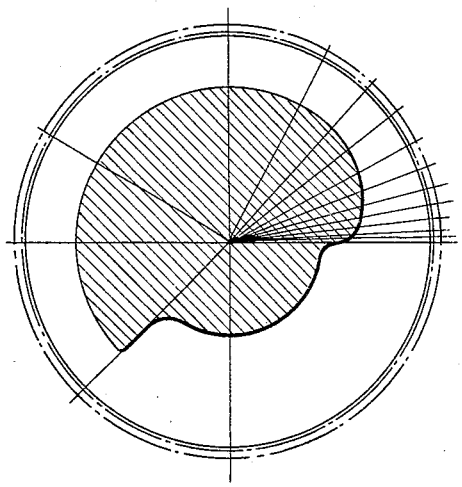
Figure 8:
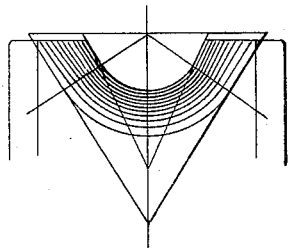
Figure 5:
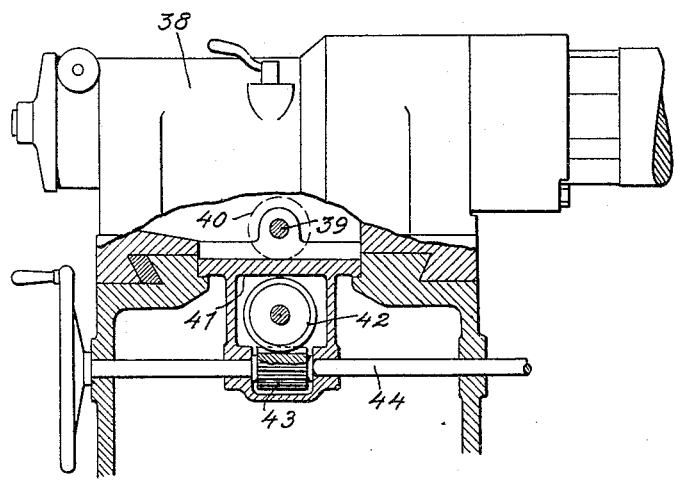
Figure 6:
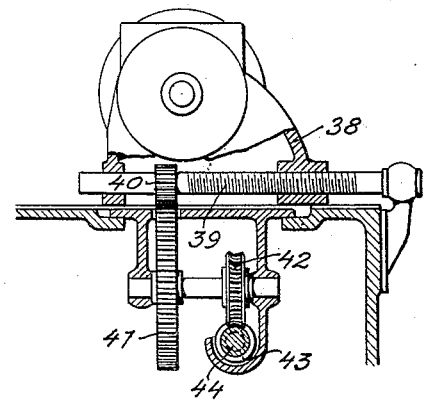

Figures 5 and 6 illustrate, respectively, a longitudinal and transverse sectional view of a head-stock employed for supporting the rolls in the apparatus illustrated in Figures 1 and 2, and showing the mechanism for effecting movements thereof, Figure 7 illustrates a transverse section through a grooved roll produced in accordance with this invention, and Figure 8 illustrates various axial sections of the groove of the roll illustrated in Figure 7, the said sections being illustrated in one plane.

Referring to Figures 1 to 3, a tool 1, is secured in a tool holder 2 which is arranged to be rotated by means of an electric motor 3 through the medium of a gear box 4, bevel wheels 5 and 6 and gear wheel 7 arranged in mesh with a ring of teeth provided upon the exterior of the upper portion of a rotatable arbour 8 arranged to carry the tool holder 2. The said tool holder is mounted in the enlarged upper portion of the arbour 8 so as to be movable relatively thereto in a radial direction of the said arbour.

The upper portion of the arbour 8 is rotatably mounted in a fixed housing 9. The radial movement of the tool holder 2 is effected during the rotary movements of the arbour 8 by mechanism illustrated in Figure 3, which is located interiorly of the said arbour. The said mechanism consists of a horizontally disposed toothed rack 10 secured to the tool holder 2, a toothed wheel 11 arranged in mesh therewith and with a further toothed rack 12 constituting a driving rod for the said mechanism.

The actuation of the rack 12 is effected by means of rising and falling movements of a pin 13 secured to the said rack and the ends of which extend through diametrically opposed slots 14 formed in the arbour 8, the said ends being secured to a cage 15 arranged to surround the said arbour. The cage 15 is slidably arranged on the arbour 8 and is arranged to be moved vertically under the control of means hereinafter described, arranged to act upon two rollers 16 mounted in the said cage.

The pin 13 in addition to transmitting the rising and falling movements of the cage 15 to the rack 12, is arranged to transmit rotary motion from the arbour 8 to the cage 15, but if desired, a coupling, other than the pin 13, may be arranged between the arbour 8, and the cage 15, so that the correct rising and falling movements of the cage relative to the arbour are not disturbed by a binding action of the pin 13 in the slots 14.

The rollers 16 are arranged to rest upon the upper surface of a ring member 17 mounted upon a non-rotatable holder 19 and upon the upper surfaces of a pair of diametrically opposed segmental members 18 pivotally mounted at their ends to the holder 19 and arranged to rest upon sleeves 29 which are movable vertically in recesses formed in the holder 19, and are arranged to control the rising and falling movements of the members 18 about their pivots. A yielding control, such as a spring 10a, anchored at one end to the enlarged upper portion of the arbour 8, and at the other end to the rack 10, secures return of the tool holder 2 and the engagement of the rollers 16 with the members 17 and 18.

The holder 19 is provided with an internal screw thread arranged in engagement with a corresponding screw thread formed externally upon an upward extension of a worm wheel 20 rotatably mounted upon a bearing provided on the casing of the mechanism and arranged in mesh with a worm 21. Rising and falling movements of the holder 19 are effected by rotation of the worm wheel 20 by means of the worm 21. The worm 21 is carried by a spindle rotatably mounted in bearings on the frame of the mechanism to which rotary motion is imparted through the medium of a train of bevel wheels 22, 23, 24, 25, 26, 27, the bevel wheel 27 being mounted upon one end of a rotatable spindle 28.

The sleeves 29 are each provided with an internally screw threaded hole with which a correspondingly screw threaded spindle 30 is arranged in engagement.

Each spindle 30 is rotatably mounted in a bearing formed in the holder 19 and is arranged to extend below the said holder and is provided with a worm wheel 31 keyed thereto. A worm 32 is arranged in mesh with each of the worm wheels 31 and is arranged to be rotated through the medium of a train of bevel wheels 33, 34, 35, 36, the bevel wheel 36 being secured to one end of a rotatable spindle 37.

Figures 7 and 8 illustrate an example of roll which may be machined upon the apparatus above described and it will be observed by reference to the said figures that the circumferential groove in the roll varies considerably in depth but always consists in cross section of a circular portion at the bottom of the groove and inclined side portions arranged tangentially to the circular portion. During the working operation upon a pair of rolls arranged as illustrated in Figure 2, the tool holder and tool are located midway between the two rolls and the cutting movements of the tool are effected by rotation of the tool holder 2 about its vertical axis and by modified movements during this rotation as hereinafter described. The feeding movement of the rolls to the tool between each rotation of the tool holder 2 is effected by the requisite relatively slight rotation of the rolls through the medium of any suitable feed mechanism. The tool is controlled whilst the circular portions of the grooves are being machined by the ring member 17 upon which the roller 16 rests as the cage 15 rotates.

As the cutting edge of the tool reaches the commencement of an inclined portion of the groove of one of the rolls, the rollers 16 are moved on to the segmental members 18 as the cage 15 rotates and the contour of the said segmental members effects the requisite vertical movement of the cage 15 which causes the radial movement of the tool holder 2 in the enlarged upper portion of the arbour 8 to modify the purely rotational movement of the said tool holder to effect a cutting movement of the tool in conformity with the straight inclined side of the groove. When the cutting point of the tool becomes located between the two rolls as illustrated in Figure 2, the contour of the segmental members 18 is arranged to effect an opposite vertical movement of the cage to that just described so that a cutting operation of the tool is made to conform with the straight inclined portion of the other roll until the tool reaches the commencement of the circular portion of the bottom of the groove in the said second roll whereupon the rollers 16 again engage with the ring member 17 and travel thereover, whilst the tool effects a cut corresponding to the said circular portion of the second roll. As the tool reaches the commencement of the other inclined side portion of the second roll, the rollers 16 again engage with the segmental members 18 and effect a similar modified rotational movement of the tool to that above described so as to produce cutting operations corresponding to the other inclined side portions of the grooves of the two rolls.

Adjustment of the depth of the cutting tool relatively to the rolls is necessitated independently of adjustments which are made by means of the normal operation of the segmental members 18 in order that the variations in cross section of the grooves in the rolls, as illustrated in Figures 7 and 8, may be effected. Such alterations in effective cutting depth of the tool relatively to the rolls are effected by rotation of the spindles 28 and 37 as hereinbefore described. The rotation of the spindles 28 and 37 may be effected by hand or mechanically and automatically by means of servo-motors or other mechanism under the control of cams or templates. Rotation of the spindle 28 to effect raising or lowering of the ring member 17 controls variations on the dimensions of the circular central portion of the grooves of the rolls produced whilst rotation of the spindle 37 to raise or lower the curved segments 18 independently of the ring 17 is arranged to effect variations in the inclination of the side portions of the grooves.

Mechanism is provided to enable each pair of head-stocks 38 to be moved together so that a roll supported thereby is moved transverse to its axis in a horizontal direction. This mechanism comprises a pair of screwed spindles 39 each arranged to extend through and to engage with a correspondingly internally screw threaded hole in one of the head stocks 38, each spindle 39 being fixed axially to the machine bed so that rotation of the said spindle effects movement of the corresponding head-stock 38.

A gear wheel 40 is keyed to the spindle 39 and is arranged in mesh with a gear wheel 41 forming one of a train of gearing, the other members of which comprise a worm wheel 42 and worm 43 carried by a spindle 44.

It is to be observed that the spindle 44 is arranged to carry the worms 43 of both the corresponding head-stocks 38 so that rotation of the said spindle is transmitted to the spindles 39 to effect movement of the head-stocks 38. A hand wheel is mounted upon the spindle 44 to permit the same to be rotated.

I claim:

1. Apparatus for machining the circumferential portions of rolls of the type described which comprises in combination means for supporting at least one roll to be machined, a tool holder continuously rotatable about an axis disposed transversely to the axis of a roll located in said supporting means to give the tool its cutting movement, means for moving said tool holder radially with respect to the axis of rotation thereof as said tool holder rotates and means for rotating said roll between rotations of said tool holder to give the roll its feeding movement.

2. Apparatus for machining the circumferential portions of rolls of the type described which comprises in combination means for supporting a pair of rolls to be machined with their axes disposed parallel to one another, a tool holder located between a pair of rolls so supported, means for rotating said tool holder about an axis disposed transversely to the axis of said rolls to give the tool its cutting movement for both rolls, means for moving said tool holder radially with respect to the axis of rotation thereof as the same rotates and means for simultaneously rotating said rolls between rotations of said tool holder to give said rolls their feeding movement.

3. Apparatus for machining the circumferential portions of rolls of the type described which comprises in combination means for supporting at least one roll to be machined, an arbour rotatably mounted about an axis disposed transversely to the axis of a roll supported by said means, means for rotating said arbour, a tool holder operatively connected to said arbour so as to rotate continuously therewith and movable radially thereon with respect to the axis of rotation of said arbour, means for controlling said radial movements of said tool holder as the same rotates to give the tool its cutting movement, and means for rotating the said roll between rotations of said tool holder to give the roll its feeding movement.

4. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and movable radially thereon with respect to the axis of rotation of said arbour, mechanism disposed within said arbour for moving said tool holder radially of said arbour and an operative connection between said mechanism and controlling means arranged exteriorly of said arbour arranged to control radial movements of said tool holder as the same rotates and means for rotating the said roll between rotations of said tool holder.

5. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour and an operative connection between the ends of said pin and mechanism arranged exteriorly of said arbour adapted to control the radial movements of said tool holder as the same rotates and means for rotating the said roll between rotations of said tool holder.

6. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged around said arbour and slidable axially thereon, means for rotating said cage with said arbour, an operative connection between said pin and said cage, at least one cam arranged to control said cage as the same rotates to move the same axially with respect to said arbour and thereby effect said radial movement of said tool holder as the same rotates, and means for rotating the said roll between rotations of said tool holder.

7. Apparatus for machining the circumferential portions of rolls of the type described which comprises in combination means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and operable to effect movement thereof in at least one direction axially of said arbour as the same rotates and thereby effect said radial movement of said tool holder as the same rotates and means for rotating the said roll between rotations of said tool holder.

8. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage arranged around said arbour and slidable thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour and a yielding control arranged to effect movement of said cage in the other direction for the purpose specified and means for rotating said roll between rotations of said tool holder.

9. Apparatus for machining the circumferential portions of rolls of the type described which comprises in combination means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative conection between said second rack and a cage surrounding said arbour and slidable thereon, means for rotating said cage with said arbour, a ring member arranged to surround said arbour and at least a pair of cams diametrically disposed with respect to said arbour, said ring and said cams being operable to engage with said cage and effect movement thereof in one direction axially of said arbour as the same rotates and a yielding control arranged to effect movement of said cage in the other direction for the purpose specified, means operatively connected to said ring and means operatively connected to said cams for moving said ring and said cams relatively to said arbour in an axial direction thereof and means for rotating said roll between rotations of said tool holder.

10. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage arranged exteriorly of said arbour and movable axially thereof, means for rotating said cage with said arbour, an operative connection between said pin and said cage, a ring member arranged to surround said arbour and at least a pair of cams diametrically disposed with respect to said arbour, said ring and said cams being operable to engage with said cage and effect movement thereof in one direction axially of said arbour as the same rotates and a yielding control arranged to effect movement of said cage in the other direction for the purpose specified, a non-rotatable support for said ring and said cams, a screw threaded bore in said support arranged to engage with a correspondingly screw threaded sleeve axially aligned with said arbour and maintained against axial displacement, gear mechanism for rotating said sleeve and means for rotating said roll between rotations of said tool holder.

11. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged exteriorly of said arbour and movable axially thereof, means for rotating said cage with said arbour, an operative connection between said pin and said cage, a non-rotatable ring member arranged to surround said arbour and carried by a supporting member, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect movement thereof in one direction axially of said arbour as the same rotates and a yielding control arranged to effect movement of said cage in the other direction for the purpose specified, and means for rotating said roll between rotations of said tool holder.

12. Apparatus for machining the circumferential portions of rolls of the type described which comprises in combination means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage arranged exteriorly of said arbour and movable axially thereof, means for rotating said cage with said arbour, a ring member arranged to surround said arbour and carried by a supporting member, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect movement thereof in one direction axially of said arbour and a yielding control arranged to effect movement of said cage in the other direction for the purpose specified, a screw threaded bore in said ring supporting member arranged in engagement with a corresponding screw threaded sleeve maintained against axial displacement, gear mechanism for rotating said sleeve and means for rotating said roll between rotation of said tool holder.

13. Apparatus for machining the circumferential portions of rolls of the type described which comprises in combination means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder for controlling said radial movements as the same rotates, an operative connection between said mechanism and a cage rotatable with and movable axially relatively to said arbour, a ring member arranged to surround said arbour and at least a pair of segmental cams diametrically disposed with respect to said arbour, said ring and said cams being operable to engage with said cage and effect movement thereof in at least one direction axially of said arbour as the same rotates and thereby effect said radial movement of said tool holder and means for rotating the said roll between rotations of said tool holder.

14. Apparatus for machining the circumferential portions of rolls of the type described which comprises in combination means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder for controlling said radial movements thereof as the same rotates, an operative connection between said mechanism and a cage rotatable with and movable axially with respect to said arbour, a ring member arranged to surround said arbour and at least a pair of segmental cams diametrically disposed with respect to said arbour, said ring and said cams being operable to engage with said cage and effect movement thereof in one direction axially of said arbour as the same rotates and a yielding control arranged to effect movement of said cage in the other direction and thereby effect corresponding radial movements of said tool holder, means operatively connected to said ring and said cams for moving the same relatively to said arbour in an axial direction thereof and means for rotating said roll between rotations of said tool holder.

15. Apparatus for machining the circumferential portions of rolls of the type described which comprises in combination means for supporting at least one roll to be machined, an arbour rotatably mounted about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder for controlling said radial movements thereof as the same rotates, an operative connection between said mechanism and a cage rotatable with and movable axially with respect to said arbour, a ring member arranged to surround said arbour, a nonrotatable supporting member for said ring at least a pair of segmental cams diametrically disposed with respect to said arbour and pivotally mounted at their ends to said ring supporting member, means for rocking said cams about their pivots, said ring and said cams being operable to engage with said cage and effect movement thereof in one direction axially of said arbour and a yielding control arranged to effect movement of said cage in the other direction and thereby effect corresponding radial movements of said tool holder, means operatively connected to said ring supporting member for moving the same axially of said arbour and means for rotating said roll between rotations of said tool holder.

16. Apparatus for machining the circumferential portions of rolls of the type described which comprises in combination means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, means for controlling said radial movements of said tool holder as the same rotates, means for rotating the said roll between rotations of said tool holder and means operatively connected to said roll supporting means for effecting movement of a roll supported thereby towards and away from said tool holder in a direction transverse to the axis of said roll.

17. Apparatus for machining the circumferential portions of rolls of the type described which comprises in combination means for supporting a pair of rolls to be machined with their axes disposed parallel to one another, a tool holder located between a pair of rolls so supported, means for rotating said tool holder about an axis disposed transversely to the plane extending through the axes of said rolls, means for moving said tool holder radially with respect to the axis of rotation thereof as the same rotates, means for rotating said rolls between rotations of said tool holder and means operatively connected to said roll supporting means and operable to effect movement of each roll towards and away from said tool holder in a direction transverse to the axes of said rolls.

18. Apparatus for machining the circumferential portions of rolls of the type described which comprises in combination two pairs of head-stocks each arranged to support a roll to be machined with the axes of the said rolls disposed parallel to one another, feed mechanism operatively connected to said head-stocks and adapted to move each pair of head-stocks towards and away from the other pair in a direction transverse to the axis of a roll supported thereby, a hollow arbour rotatable about an axis disposed transversely to the plane extending through the axes of the rolls supported by said head-stocks, means for rotating said arbour, a tool holder located between said rolls and operatively connected to said arbour so as to rotate therewith and slidable in guides radially with respect to the axis of rotation of the said arbour, a rack on said tool holder disposed transversely to the axis of said arbour arranged in mesh with a gear wheel rotatably mounted in said arbour, a second rack disposed axially of said arbour and arranged in mesh with said gear wheel, a pin carried by said second rack and extending through diametrically opposed slots formed axially thereon, means for rotating said cage with said arbour, an operative connection between said pin and said cage, a ring member arranged to surround said arbour and carried by a non-rotatable supporting member, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect movement thereof in one direction axially of said arbour and a yielding control arranged to effect movement of said cage in the other direction for effecting corresponding radial movement of said tool holder, a screw-threaded bore in said ring supporting member arranged in engagement with a corresponding screw-threaded sleeve maintained against axial displacement, gear mechanism for rotating said sleeve and means for rotating said roll between rotations of said tool holder.

19. Apparatus for machining the circumferential portions of rolls of the type described which comprises in combination two pairs of head-stocks each arranged to support a roll to be machined with the axes of the said rolls disposed parallel to one another, feed mechanism operatively connected to said head-stocks and adapted to move each pair of head-stocks towards and away from the other pair in a direction transverse to the axis of a roll supported thereby, a tool holder disposed between a pair of rolls supported by said head-stocks, means for rotating said tool holder about an axis disposed transversely to the plane extending through the axes of said rolls, means for moving said tool holder with respect to the axis of rotation thereof as the same rotates and means for rotating said rolls between rotations of said tool holder.

In testimony whereof I have signed my name to this specification.

HANS SCHIMMEL.